United States Patent
Mateos Sole (10) Patent No.: US 11,610,569 B2
(45) Date of Patent: *Mar. 21, 2023

(54) METHODS, SYSTEMS, DEVICES AND COMPUTER PROGRAM PRODUCTS FOR ADAPTING EXTERNAL CONTENT TO A VIDEO STREAM

(71) Applicant: Dolby International AB, Amsterdam Zuidoost (NL)

(72) Inventor: Antonio Mateos Sole, Barcelona (ES)

(73) Assignee: DOLBY INTERNATIONAL AB, Amsterdam Zuidoost (NL)

(*) Notice: Subject to any disclaimer, the term of this patent is extended or adjusted under 35 U.S.C. 154(b) by 158 days.

This patent is subject to a terminal disclaimer.

(21) Appl. No.: 17/146,263

(22) Filed: Jan. 11, 2021

(65) Prior Publication Data

US 2021/0241739 A1    Aug. 5, 2021

Related U.S. Application Data

(63) Continuation of application No. 16/627,319, filed as application No. PCT/EP2018/067021 on Jun. 26, 2018, now Pat. No. 10,891,930.

(Continued)

(30) Foreign Application Priority Data

Jun. 29, 2017  (ES) .............................. ES201730860
Sep. 1, 2017   (EP) .................................... 17189084

(51) Int. Cl.
*G10H 1/36*        (2006.01)
*G11B 27/031*   (2006.01)

(Continued)

(52) U.S. Cl.
CPC ........... *G10H 1/368* (2013.01); *G11B 27/031* (2013.01); *G11B 27/28* (2013.01); *G11B 27/34* (2013.01)

(58) Field of Classification Search
CPC ...... G10H 1/368; G11B 27/031; G11B 27/28; G11B 27/34

(Continued)

(56) References Cited

U.S. PATENT DOCUMENTS 5,359,464 A * 10/1994 Wilkinson ............. H04N 7/011
                                                                    386/221
5,391,828 A *  2/1995 Tajima .................... G10H 1/36
                                                                     84/645

(Continued)

FOREIGN PATENT DOCUMENTS

CN      102025919      4/2011
CN      102037728      4/2011

(Continued)

OTHER PUBLICATIONS

Dunker, P. et al. "Content-Aware Auto-Soundtracks for Personal Photo Music Slideshows" IEEE International Conference on Multimedia and Expo, Barcelona, 2011, pp. 1-5.

(Continued)

*Primary Examiner* — Christina M Schreiber (57) ABSTRACT

This disclosure falls into the field of adapting external content to a video stream, and more specifically it is related to analyzing the video stream to define a suitable narrative model, and adapting the external content based on this narrative model.

19 Claims, 6 Drawing Sheets

Related U.S. Application Data (60) Provisional application No. 62/556,580, filed on Sep. 11, 2017.

(51) Int. Cl.
*G11B 27/28* (2006.01)
*G11B 27/34* (2006.01)

(58) Field of Classification Search
USPC .......................................................... 84/610
See application file for complete search history.

(56) References Cited

U.S. PATENT DOCUMENTS

| | | | | |
|---|---|---|---|---|
| 7,027,124 | B2* | 4/2006 | Foote | G11B 27/36 |
| 7,754,959 | B2* | 7/2010 | Herberger | G10H 1/368 |
| | | | | 84/622 |
| 7,849,070 | B2* | 12/2010 | Fassett | G06F 16/68 |
| | | | | 707/731 |
| 8,009,918 | B2* | 8/2011 | Van Droogenbroeck | |
| | | | | G06V 10/28 |
| | | | | 382/181 |
| 8,321,414 | B2* | 11/2012 | Aucouturier | G06F 16/58 |
| | | | | 386/350 |
| 8,340,436 | B2* | 12/2012 | Das | G06V 20/40 |
| | | | | 382/224 |
| 8,527,859 | B2* | 9/2013 | Henshall | G09B 5/062 |
| | | | | 715/204 |
| 9,141,604 | B2* | 9/2015 | Thirumalainambi | |
| | | | | G06F 40/242 |
| 9,247,225 | B2* | 1/2016 | Yehezkel | G06F 16/78 |
| 10,891,930 | B2* | 1/2021 | Mateos Sole | G11B 27/34 |
| 2001/0020954 | A1* | 9/2001 | Hull | G06Q 10/10 |
| | | | | 715/730 |
| 2002/0085116 | A1* | 7/2002 | Kuwano | H04N 21/4622 |
| | | | | 348/465 |
| 2004/0086185 | A1* | 5/2004 | Sun | G06K 9/6224 |
| | | | | 382/224 |
| 2007/0243515 | A1* | 10/2007 | Hufford | G09B 5/067 |
| | | | | 434/319 |
| 2009/0034937 | A1* | 2/2009 | Kusunoki | H04N 19/87 |
| | | | | 386/248 |
| 2009/0115901 | A1* | 5/2009 | Winter | H04N 21/4312 |
| | | | | 348/565 |
| 2009/0226046 | A1* | 9/2009 | Shteyn | H04N 21/6582 |
| | | | | 707/999.1 |
| 2011/0154197 | A1* | 6/2011 | Hawthorne | G06F 16/41 |
| | | | | 715/704 |
| 2011/0292288 | A1* | 12/2011 | Deever | H04N 21/8549 |
| | | | | 348/590 |
| 2012/0033132 | A1* | 2/2012 | Chen | H04N 5/04 |
| | | | | 348/E7.001 |
| 2012/0219271 | A1* | 8/2012 | Vunic | G06V 20/40 |
| | | | | 704/235 |
| 2012/0275714 | A1* | 11/2012 | Gao | G06F 16/50 |
| | | | | 382/224 |
| 2013/0023343 | A1* | 1/2013 | Schmidt | A63F 13/54 |
| | | | | 463/35 |
| 2013/0297599 | A1* | 11/2013 | Henshall | G11B 27/105 |
| | | | | 707/736 |
| 2019/0035431 | A1* | 1/2019 | Attorre | G11B 27/34 |
| 2019/0287415 | A1* | 9/2019 | Zavesky | G09B 7/00 |
| 2020/0118534 | A1* | 4/2020 | Mateos Sole | G10H 1/368 |
| 2021/0241739 | A1* | 8/2021 | Mateos Sole | G11B 27/34 |

FOREIGN PATENT DOCUMENTS

| | | | |
|---|---|---|---|
| CN | 102422322 | 4/2012 | |
| CN | 102970527 | 3/2013 | |
| CN | 105659314 | 6/2016 | |
| EP | 2073193 A1 * | 6/2009 | ....... G06F 17/30743 |
| EP | 2073193 A1 | 6/2009 | |
| WO | 2012004650 A1 | 1/2012 | |

OTHER PUBLICATIONS

Hanjalic, A. et al. "Affective Video Content Representation and Modeling", IEEE Transactions on Multimedia, vol. 7, No. 1, Feb. 1, 2005, pp. 143-154.

Soleymani, M. et al. "Emotional Analysis of Music: A Comparison of Methods" ACM Conference on Multimedia, pp. 1161-1164, Nov. 3, 2014.

Stupar, A. et al. "SRbench—a benchmark for Soundtrack Recommendation Systems" Proc. of the 22nd ACM International Conference on Conference on Information & Knowledge Management, 2013, pp.

* cited by examiner

|        | 702a 702b |         | 702c         | 702d | 702e  | 702f |
|--------|-----------|---------|--------------|------|-------|------|
| Bass   | Full      | Full    | Delay Reveb  | Full | Decr. |      |
| Drum1  | Full      | Full    | Delay Reveb  | Full | Decr. |      |
| Drum2  | Mute      | Increasing |           |      | Decr. |      |
| Guitarr| Mute      | Increasing |           |      | Decr. |      |
| Keyb.  | Mute      | Increasing | Mute      | Full | Decr. |      |
| Voice  | Mute      | Increasing | Mute      | Full | Decr. |      |

METHODS, SYSTEMS, DEVICES AND COMPUTER PROGRAM PRODUCTS FOR ADAPTING EXTERNAL CONTENT TO A VIDEO STREAM

CROSS-REFERENCE TO RELATED APPLICATIONS

This application is a continuation of U.S. patent application Ser. No. 16/627,319, filed Dec. 29, 2019, which is the U.S. national stage of International Patent Application No. PCT/EP2018/067021, filed Jun. 26, 2018, which claims priority to U.S. Provisional Patent Application No. 62/556,580, filed Sep. 11, 2017, European Patent Application No. 17189084.1, filed Sep. 1, 2017, and Spanish Patent Application No. P201730860, filed Jun. 29, 2017, all of which are incorporated herein by reference in their entirety.

TECHNICAL FIELD

This disclosure falls into the field of adapting external content to a video stream, and more specifically it is related to analyzing the video stream to define a suitable narrative model, and adapting the external content based on this narrative model.

BACKGROUND ART

In recent years, video-sharing websites, and services such as YouTube, Vimeo, Flickr etc. have made the number of videos available online to explode. Only on YouTube, 300 hours of video are uploaded every minute (in 2016). Needless to say, most of the videos uploaded online is made by amateurs, in the sense that the video is not produced by a professional producer. As such, content that would emphasize or improve the viewers experience of the video, such that music or overlaid animations etc. is not present when the video is play backed by a viewer, or added to the video in an inferior way, due to lack of experience, skills, software, time etc. of the user uploading the video.

It is within this context that this disclosure lies.

BRIEF DESCRIPTION OF THE DRAWINGS

Example embodiments will now be described with reference to the accompanying drawings, on which.

All the figures are schematic and generally only show parts which are necessary in order to elucidate the disclosure, whereas other parts may be omitted or merely suggested. Unless otherwise indicated, like reference numerals refer to like parts in different figures.

DETAILED DESCRIPTION

In view of the above it is an object to provide methods, systems, devices, and computer program products for adapting external content to a video stream which may facilitate, simplify, and improve the possibility to increase user experience of the video stream by deriving parameters from the video stream which can be used for the adaptation of the external content.

I. OVERVIEW—ADAPTING EXTERNAL CONTENT TO A VIDEO STREAM HAVING A TIME SPAN

According to a first aspect, example embodiments propose methods for adapting external content to a video stream, devices implementing the methods, systems comprising the devices, and computer program product adapted to carry out the methods. The proposed methods, devices, systems, and computer program products may generally have the same features and advantages.

According to example embodiments there is provided a method for adapting external content to a video stream having a time span, the video stream comprising a plurality of frames each comprising pixels, the method comprising the steps of:

computing a first plurality of difference indicators, each indicating a difference between values of the pixels of subsequent frames, wherein the computing of each specific difference indicator of the first plurality of difference indicators comprises:
  comparing corresponding pixel values between two subsequent frames, and calculating the specific difference indicator based on the comparisons, computing a second plurality of difference indicators by convolving the first plurality of difference indicators with a strictly decreasing function, each difference indicator of the second plurality of difference indicators corresponding to a specific position in time of the video stream, fitting a predetermined parametrizable function to the second plurality of difference indicators, thereby yielding a function descriptive of a narrative model, FNM, for the video stream during the time span of the video stream, and using the FNM to adapt external content to the video stream.

By the term "narrative model" should, in the context of present specification, be understood models such as the Hollywood Model, the Freytag Triangle, the Double Freytag Triangle, the Narrative Arc etc. Any suitable narrative model (for example a user-specific model which may be targeted to the content of the video stream, e.g. specific for videos of a soccer player which score a goal) which can be parameterized are applicable. A parameterized model can be adapted, leading to e.g. a prolonged intro-part of the narrative model, or shorten the valley of the Double Freytag Triangle etc.

In video games, music or other external content is often adapted to low level parameters of the video game such as if the hero is damaged, if many enemies surround the characters, if it is daytime or nighttime etc. However, for video streams, such parameters are not easily extractable, at least not automatically. To facilitate automatic, or semi-automatic, adaptation of external content to a video stream, the inventor has realized that the infinite look-ahead of the video stream can be used as an advantage for finding a suitable narrative model which matches the video stream. When a suitable narrative model has been found and matched to the video stream, this model can be used for adapting the external content, e.g. music, animations, external lighting, etc., to the video stream. In summary, the narrative model represents a model of different state of emotions that the viewer may experience when looking at the video. As well known, such emotions are not instantaneous but instead accumulative. For example, the viewer will not immediately excited when an exciting moment occurs in the video, instead this is an accumulative effect which builds up during a time span of the video.

Each pixel has values associated with it, e.g. depending on the color space/alpha space of the image frame. For example, if the image frame is in the RGB/HSV/RGBA/CMYK color space, each pixel has values associated with this particular color space. It should be noted that not all values associated with the pixels of the image frames must be used for calculating the first plurality of difference indicators. For example, according to one embodiment, only the alpha value of a pixel in the RGBA color space may be used when comparing corresponding pixel values between to image frames.

By first calculating a first plurality of difference indicators, which each are measures of differences between subsequent frames, e.g. being a measure of a change of the image content of frame X and frame X+n, and then convolving theses measure with a strictly decreasing function for computing a second plurality of difference indicators, the values of the second plurality of difference indicators may capture the inherent characteristic of emotions being accumulative. The second plurality of difference indicators can thus be seen as a plot of an emotion index of the video stream. The predetermined parametrizable function is then fitted to the second plurality of difference indicators (emotion index plot) to yield a function descriptive of a narrative model, FNM, for the video stream during the time span of the video stream. The FNM can then be used for adapting external content to the video stream in an advantageous way. The above embodiment is thus advantageous in that a FNM matching that specific video stream is automatically yielded.

According to some embodiments, the method further comprises the steps of: after yielding the FNM for the video stream,
comparing the second plurality of difference indicators to the FNM,
determining that it exists a continuous subset of difference indicators among the second plurality of difference indicators wherein all difference indicators of the subset of difference indicators have a value being at least a threshold lower than a corresponding value in the FNM, wherein the continuous subset of difference indicators corresponding to a sub time span of the video stream,
adapting the external content to the video stream also based on a starting point in time and an ending point in time for the sub time span of the video stream.

In storytelling, the use of an anti-climax is a common tool to make sudden transitions between e.g. an exciting moment to something disappointing (for the viewer). Expectations are raised, everything is built-up and then suddenly something boring or disappointing happens. This can be included in the video at any point and is as such not easily mapped to known narrative models. In this embodiment, the anti-climax in a story (of the video stream) can be automatically found in the video stream and the starting point and ending point can be used for adaptation of the external content.

According to some embodiments, the step of computing the plurality of second difference indicators further comprises the step of comparing each of the first plurality of difference indicators to a predetermined threshold and setting any difference indicator being below said predetermined threshold to zero before performing the step of convolving the first plurality of difference indicators with the strictly decreasing function. In other words, only differences between subsequent frames in the video stream which exceed a threshold are convolved with the strictly decreasing functions to produce the second plurality of difference indicators. Consequently, noise and other minor changes between frames can be neglected when producing the emotion index for the video stream.

According to some embodiments, each specific difference indicator of the first plurality of difference indicators is computed by calculating differences between RGB values of corresponding pixels of two subsequent frames, and calculating the specific difference indicator based on the calculated differences. For example, the average difference between the three difference values for a pixel may be used.

According to some embodiments, the strictly decreasing function is an exponentially decaying function which falls below 1% of its initial value after 0.1-2 seconds. The strictly decreasing function may for example be an exponentially decaying function which falls below 1% of its initial value after 1 second. Difference decay times may lead too different "granularity" of the emotion index. Shorter time means a more instantaneous emotion, since future changes between frames (future first difference indicators) are not taken into consideration as much.

According to some embodiments, the step of using the FNM to adapt external content to the video stream is automatic. This means that an algorithm is used for extracting aspects from the FNM, and automatically adjusting the external content based on this. For example, in case the external content is lightning from lamps e.g. placed around a display showing the video stream, the lighting may change color based on the mood (FNM) of the video stream.

According to some embodiments, the external content consists of pre-recorded music. Music may advantageously be used for enhancing the emotions of a viewer when watching a video stream and thus improve user experience of the viewer.

According to some embodiments, the pre-recorded music is recorded in a multitrack format. A multi-track format improves the possibilities to in an easy way adapt the external content to the FNM of the video stream, since a track can be turned on/off or be volume adjusted independently of other tracks in the multi-track music recording. Similarly, audio effects can be applied to a subset of the tracks, for example, to apply a long delay reverb to a track that is abruptly muted at the beginning of an anti-climax phase.

According to some embodiments, the step of using the FNM to adapt external content to the video stream comprises muting and unmuting of a track of a multitrack music recording based on the FNM. Alternatively, or additionally, the step of using the FNM to adapt external content to the video stream comprises volume adjustment of a track of a multitrack music recording based on the FNM. Generally, the step of using the FNM to adapt external content to the video stream comprises applying different audio effects of a track of a multitrack music recording based on the FNM.

In a similar way, the starting point and ending point of an anti-climax may be used for adapting the external content to the video stream. For example, the step of adapting the external content to the video stream also based on a starting point in time and an ending point in time for the sub time span of the video stream comprises muting and unmuting of a track of a multitrack music recording based on the starting point in time and the ending point in time. Alternatively, or additionally, the step of adapting the external content to the video stream also based on a starting point in time and an ending point in time for the sub time span of the video stream comprises volume adjustment of a track of a multitrack music recording based on the starting point in time and the ending point in time.

According to some embodiments, the step of fitting the predetermined parametrizable function to the second plurality of difference indicator, thereby yielding a FNM for the video stream during the time span of the video stream, is done by least squares fitting. This is an efficient way of fitting (approximating) a functions to a plot of values.

According to some embodiments, a plurality of predetermined parametrizable functions is fitted to the plurality of second difference indicators, wherein the method further comprises calculating a fitness value for at least two fitted parametrizable functions and selecting the function with the highest fitness value as the FNM. As described above, a plurality of known FNMs exist, which each can be parameterized into a parametrizable function. Moreover, a user-specific parametrizable function may also be employed, e.g. targeted to a specific genre of video streams. In other words, any parametrizable function can be used for yielding the FNM.

According to some embodiments, the step of fitting the predetermined parametrizable function to the plurality of second difference indicators further comprise detecting a plurality of event markers, each event marker corresponding to a frame of the video stream. Such event markers may for example include "start of intro", "end of intro", "start of build-up", "start of outro" etc. In this embodiment, the actual value of the FNM in a point of time of the video stream need not to be considered, instead only the phase (e.g. intro, build up, outro, anti-climax, may also be called "act") of the narrative model which the video stream currently is in, may be considered.

According to some embodiments, the muting and unmuting of tracks of the multitrack music recording is based on the detected event markers. For example, during the intro of the FNM, only the drums and first guitar are played, but when the build-up phase starts, all tracks are unmuted. The same may be valid for volume adjustment which thus can be based on the detected event markers.

According to some embodiments, the step of computing a first plurality of difference indicators comprise comparing corresponding pixel values between adjacent frames. As such, the number of difference indicators may be equal to the numbers of frames of the video stream. According to other embodiments, every n:th frame is used for computing a difference indicator, leading to that the number of first difference indicators will be number of frames/n.

According to some embodiments, the step of comparing subsequent frames comprises calculating an absolute difference between values of corresponding pixels. Consequently, it does not matter if e.g. the RGB values of a pixel is increased or reduced compared to the corresponding pixel in a previous frame.

According to some embodiments, the second plurality of difference indicators is normalized to comprise values between 0-1. This may simplify the fitting to the parametrizable functions, and also normalize different ranges of RGB value (32 bits, 64 bits etc.) between video streams.

According to some embodiments, the corresponding pixels are pixels having a same index value in the two subsequent frames.

According to some embodiments, the step of adapting external content to the video stream comprises the step of selecting said external content from a database of external content. This may facilitate e.g. that copyright issues of the external content already are handled.

According to some embodiments, the method further comprises the step of selecting the predetermined parametrizable function from a plurality of predetermined parametrizable functions. For example, if the video stream shows a sports clip of a slam dunk in basketball, a suitable parametrizable function can be chosen.

According to some embodiments, the method further comprising providing functionality for manually editing the FNM by a user.

According to some embodiments, the method further comprising providing functionality for manually editing the fitted predetermined parametrizable function by a user.

According to some embodiments, the method further comprising providing functionality for manually editing the starting point in time and the ending point in time by a user. Detected anti-climax(es) may thus be manually edited.

In a second aspect, the present invention provides a computer program product implementing a method for adapting external content to a video stream having a time span, the video stream comprising a plurality of frames each comprising pixels, the method comprising the steps of:
  computing a first plurality of difference indicators, each indicating a difference between values of the pixels of subsequent frames, wherein the computing of each specific difference indicator of the first plurality of difference indicators comprises:
    comparing corresponding pixel values between two subsequent frames, and calculating the specific difference indicator based on the comparisons,
  computing a second plurality of difference indicators by convolving the first plurality of difference indicators with a strictly decreasing function, each difference indicator of the second plurality of difference indicators corresponding to a specific position in time at the video stream,
  fitting a predetermined parametrizable function to the second plurality of difference indicator, thereby yielding a function descriptive of a narrative model, FNM, for the video stream during the time span of the video stream, and
  using the FNM to adapt external content to the video stream.

In a third aspect, the present invention provides a device for adapting external content to a video stream having a time span, the video stream comprising a plurality of frames each comprising pixels, the device comprising a processor adapted for:

computing a first plurality of difference indicators, each indicating a difference between values of the pixels of subsequent frames, wherein the computing of each specific difference indicator of the first plurality of difference indicators comprises:
      comparing corresponding pixel values between two subsequent frames, and calculating the specific difference indicator based on the comparisons,
   computing a second plurality of difference indicators by convolving the first plurality of difference indicators with a strictly decreasing function, each difference indicator of the second plurality of difference indicators corresponding to a specific position in time at the video stream,
   fitting a predetermined parametrizable function to the second plurality of difference indicator, thereby yielding a function descriptive of a narrative model, FNM, for the video stream during the time span of the video stream, and
   using the FNM to adapt external content to the video stream.

In other words, the third aspect provides a computer program product comprising a computer-readable storage medium with instructions adapted to carry out the method any embodiment of the first aspect when executed by a device having processing capability.

According to some embodiments, the device further comprises a computer program product suitable for adapting external content. The computer program product may for example be software for editing music, wherein the external content is music.

In a fourth aspect, the present invention provides a system for adapting external content to a video stream having a time span, the video stream comprising a plurality of frames each comprising pixels, the system comprising a device connected to a database, the database comprising external content, wherein the device comprises a processor adapted for:

computing a first plurality of difference indicators, each indicating a difference between values of the pixels of subsequent frames, wherein the computing of each specific difference indicator of the first plurality of difference indicators comprises:
      comparing corresponding pixel values between two subsequent frames, and calculating the specific difference indicator based on the comparisons,
   computing a second plurality of difference indicators by convolving the first plurality of difference indicators with a strictly decreasing function, each difference indicator of the second plurality of difference indicators corresponding to a specific position in time at the video stream,
   fitting a predetermined parametrizable function to the second plurality of difference indicator, thereby yielding a function descriptive of a narrative model, FNM, for the video stream during the time span of the video stream,
   selecting external content from the database, and
   using the FNM to adapt the selected external content to the video stream.

The second, third and fourth aspect may generally have the same features and advantages as the first aspect.

II. EXAMPLE EMBODIMENTS

Figure 1:
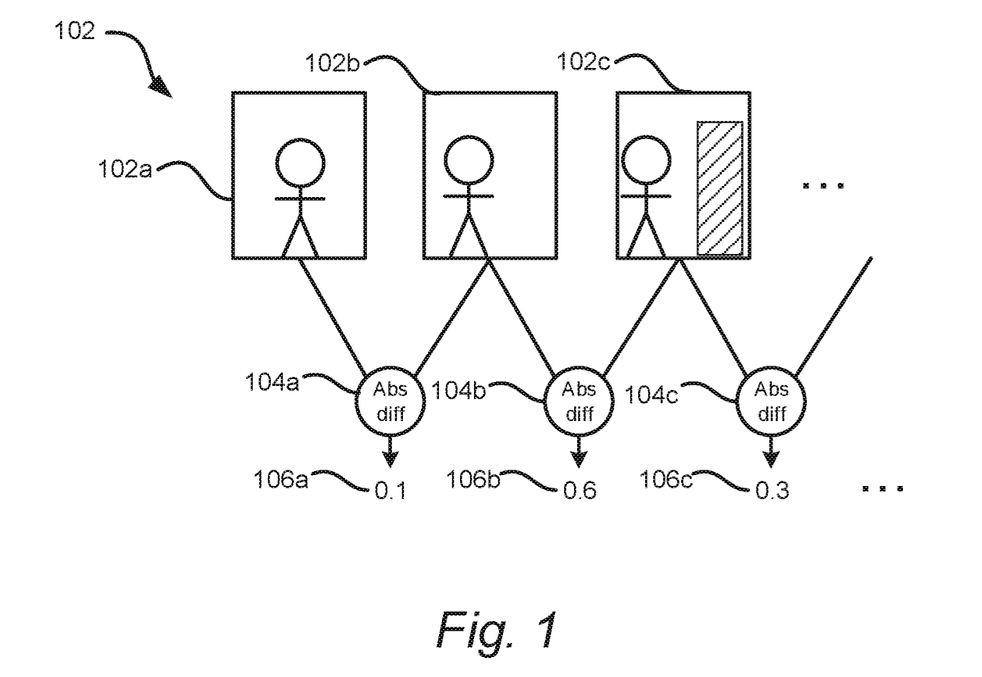
FIG. 1 shows how first difference indicators between subsequent frames in a video stream is calculated according to embodiments.

FIG. 1 shows by way of example how a first plurality of difference indicators 106a-c are calculated from a video stream 102 comprising a plurality of frames 102a-c. Each difference indicator 106a-c indicates a difference between values of the pixels of subsequent frames. In the example of FIG. 1, each difference indicator 106a-c is calculated from comparing adjacent frames in the video stream 102. In other embodiments, only every second, third, fourth, etc., frame is used for calculating difference indicators. This may reduce the computational complexity for the present method. Each specific difference indicator 106a-c is calculated by comparing corresponding pixel values between two subsequent frames (e.g. difference indicator 106a is calculated by comparing corresponding pixel values between the two first frames 102a, 102b), and calculating the specific difference indicator based on the comparisons. For example, a difference indicator 106a may be calculated by:

1. Read all pixels (or every other, third, etc., pixel) in the second frame 102b of the video stream 102. For example, a RGB based video stream 102 may result in three values per pixel.
2. Compare the values of the pixels read in 1) with values of corresponding pixels (i.e. corresponding pixel values) in the previous frame 102a.
3. Calculate an absolute difference 104a for each pixel read in 1) and 2)
4. Take the average of the absolute differences over all pixels, as calculated in 3).

Optionally, the values of the calculated difference indicators 106a-c from absolute differences 104a-104c, respectively, are normalized to range between 0-1.

In other embodiments, only a difference in brightness, or luminance, between corresponding pixels of the subsequent frames are calculated and used for calculating the difference indicator in a similar way as described above.

Figure 2:
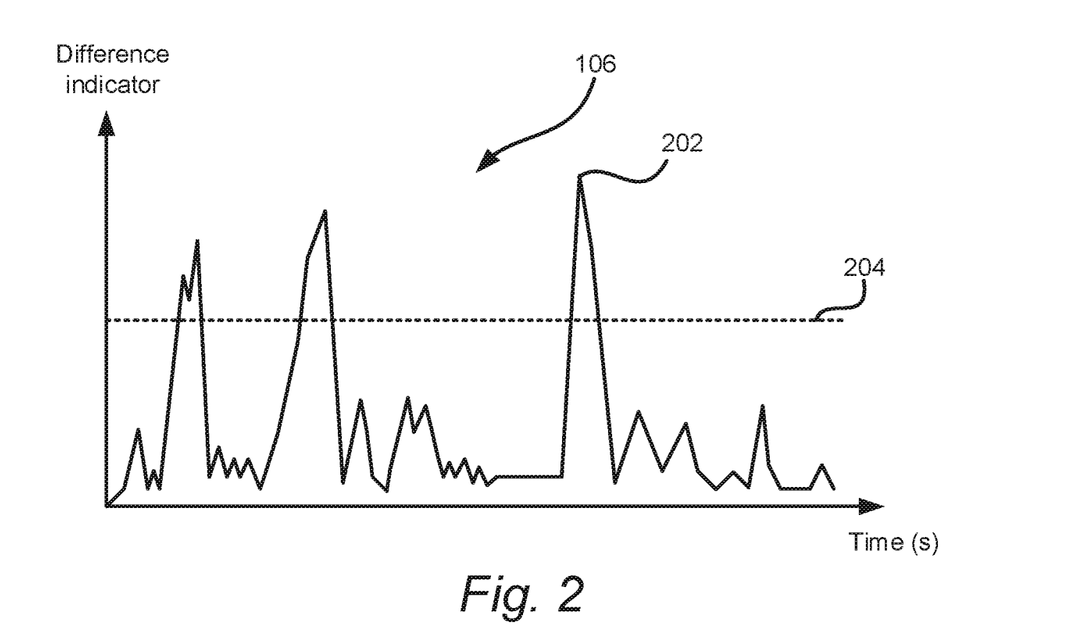
FIG. 2 shows, by way of example, a graph of difference indicators of FIG. 1 during a time span of a video stream.

FIG. 2 shows a plot of the computed first plurality of difference indicators 106. According to some embodiments, each of the first plurality of difference indicators is compared to a predetermined threshold 204. For difference indicators with values above the threshold, for example value 202 in FIG. 2, nothing is done and these difference indicators will keep their values. However, for difference indicators with values below the threshold 204, theses difference indicators will be set to zero or some other constant value before continuing the method. It should be noted that using the threshold 204 is optional. According to some embodiments, the first plurality of difference indicators 106 will be used as is without comparing them to any threshold 204.

Figure 4:
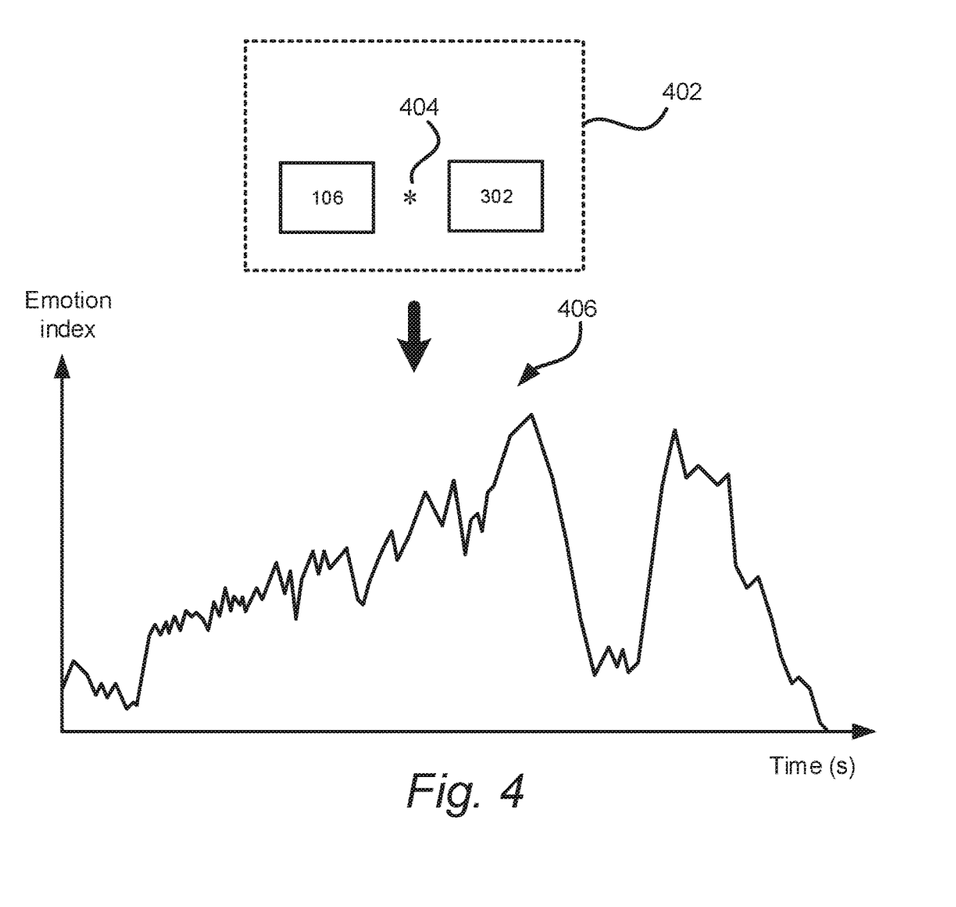
FIG. 4 shows, by way of example, computation of a second plurality of difference indicators.

FIG. 4 shows by way of example how the first plurality of difference indicators 106 is convolved 404 with a strictly decreasing function 302 for computing at 402 a second plurality of difference indicators 406. Each difference indicator of the second plurality of difference indicators corresponds to a specific position in time in the video stream, i.e. a specific temporal position. As described above, the plot of the second plurality of difference indicators 406 may be seen as an emotion index over the duration of the video stream. By using the first plurality of difference indicators as described above (calculated based on differences between subsequent frames) which is convolved with a decaying function which results in an accumulative index, very frequent cuts, or radical changes in color values between frames in the video stream, may result in a higher emotion index.

Figure 3:
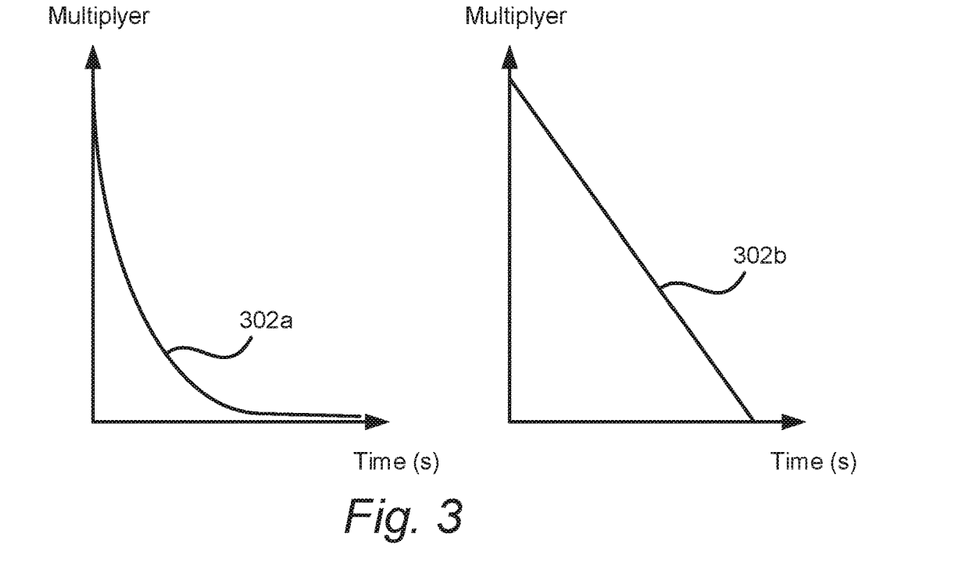
FIG. 3 shows two different decreasing functions according to embodiments.

FIG. 3 show two different examples of a strictly decreasing function 302a-b that can be used in the context of this disclosure. The left function 302a represent an exponentially decaying function 302a. The exponentially decaying function may for example fall below 1% of its initial value after 0.1-2 seconds, such as after 0.3, 0.7, 1, 1.2, 1.7 or 2 seconds. Longer timespans such as 5-10 seconds may also be used. According to other embodiments, the decreasing function is linear, such in the right function 302b.

Figure 5:
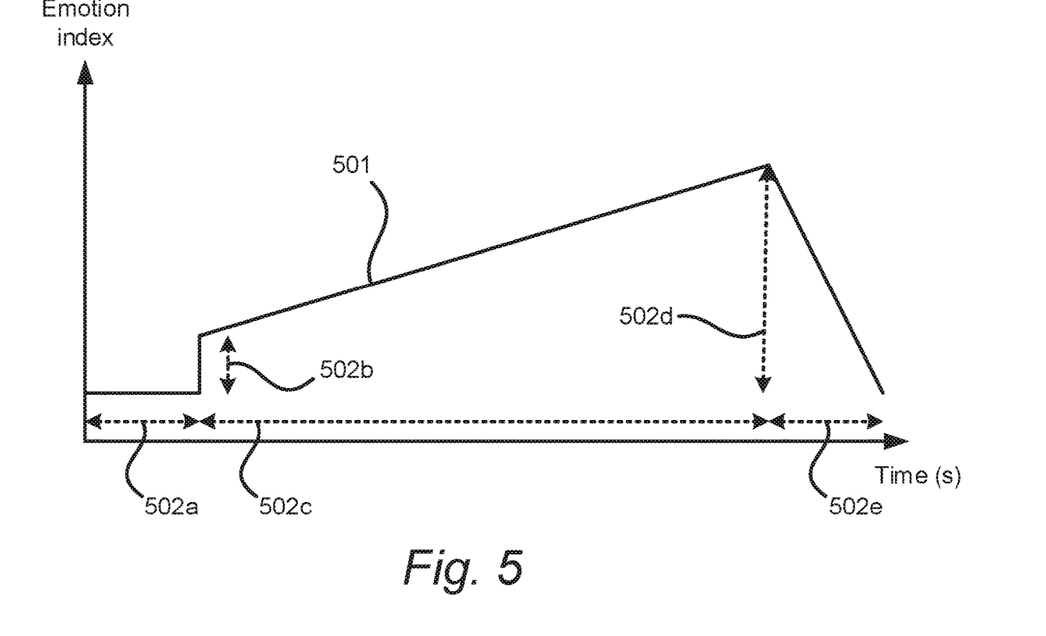
FIG. 5 shows a predetermined parametrizable function according to embodiments.
Figure 8:
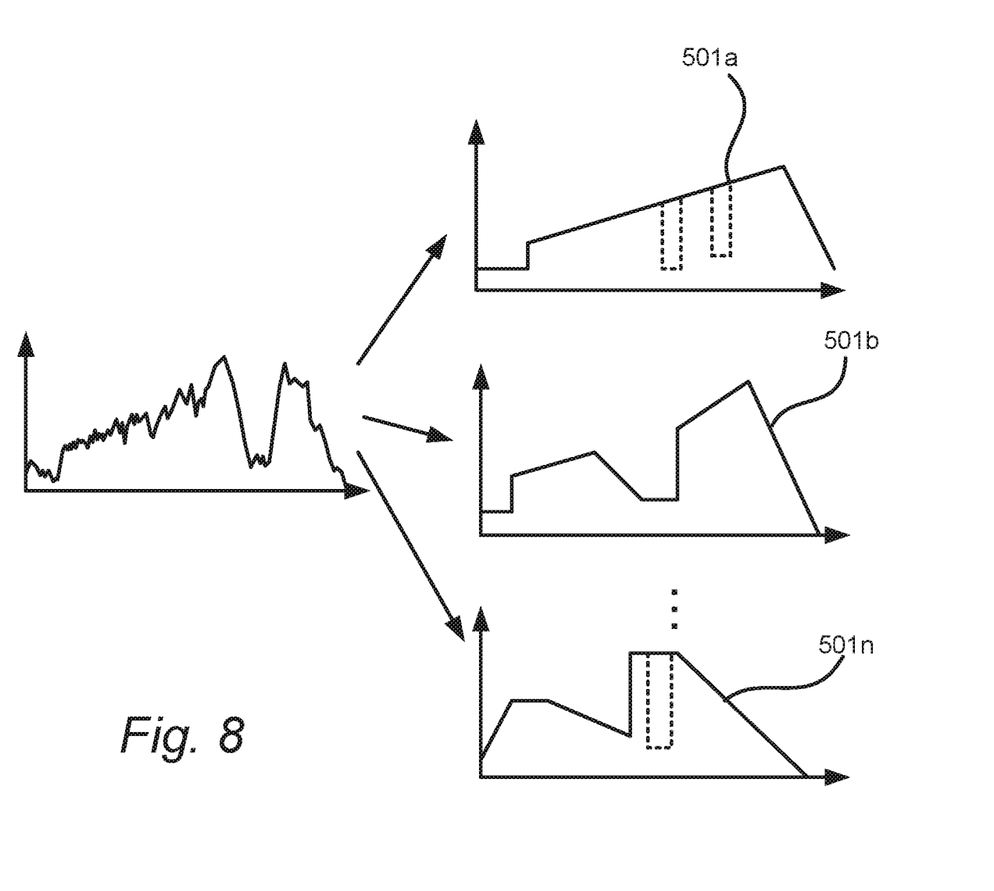
FIG. 8 shows, by way of example, a plurality of predetermined parametrizable functions which can be fitted to the second plurality of difference indicators of FIG. 4.

FIG. 5 shows by way of example a predetermined parametrizable function 501 which may be used for yielding a function descriptive of a narrative model, FNM, for the video stream. In the example function of FIG. 5, five parameters 502a-e are used for determining what the function will look like. We have an intro phase, which length is determined by parameter 502a. Then we have an abrupt change (determined by parameter 502b) which starts the build-up phase (rising action phase), which length is determined by parameter 502c, and which pitch is determined by parameter 502d. Finally, there is an outro phase which length is determined by parameter 502e. The predetermined parametrizable function 501 in FIG. 5 is merely by way of example, other examples are shown in FIG. 8, and as described above, any suitable predetermined parametrizable function may be employed for the purpose of yielding a FNM as described herein.

The predetermined parametrizable function 501 in FIG. 5 is then fitted to the second plurality of difference indicators 406 to yield a FNM 600. This may be done by for example least square fitting or any other suitable approximation algorithms between a set of values (i.e. the second plurality of difference indicators 406) and a function. Moreover, anti-climax(es) 601 in the video stream may be determined. This may be done by determining that it exists a continuous subset of difference indicators among the second plurality of difference indicators 406 wherein all difference indicators of the subset of difference indicators have a value being at least a threshold 606 lower than a corresponding value in the FNM 501. From the above, a starting point in time 602 and an ending point in time 604 for the sub time span of the video stream may be determined which later can be used for adapting the external content to the video stream. It should be noted that more than one anti-climax 601 may be detected. It should also be noted that the FNM may include phases similar to the anti-climax 601. In other words, the one or more anti-climaxes start-end points may be determined by considering an extended FNM that contains them. The embodiment discussed in conjunction with FIG. 6 relate to an embodiment where an anti-climax not being part of the FNM 501 is detected and where its starting point in time 602 and its ending point in time 604 later can be used for adapting the external content to the video stream.

Figure 6:
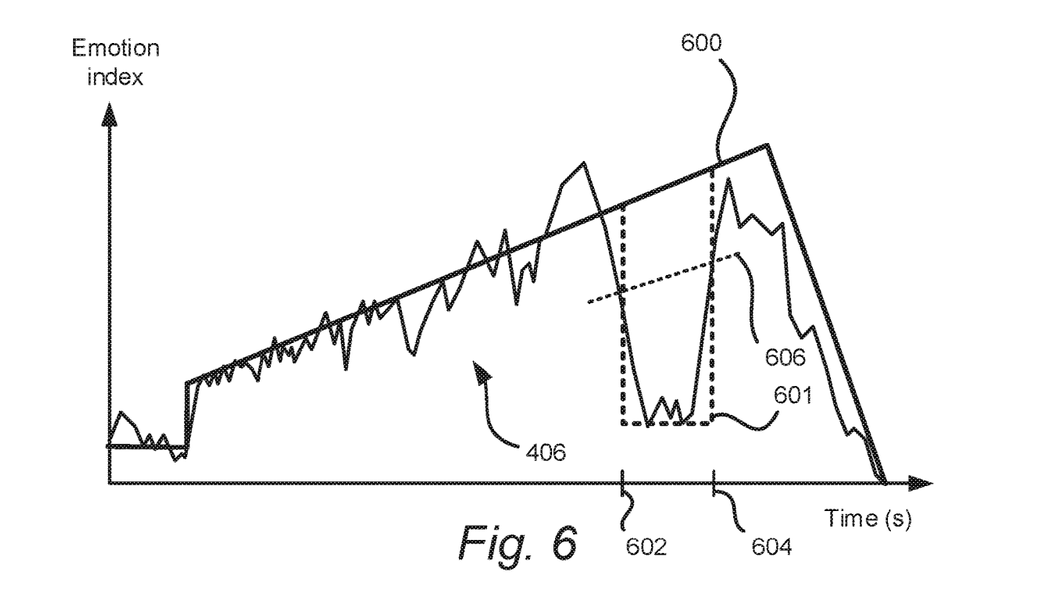
FIG. 6 shows fitting the predetermined parametrizable function of FIG. 5 to the second plurality of difference indicators of FIG. 4, and determining an anti-climax, according to embodiments.
Figure 7:
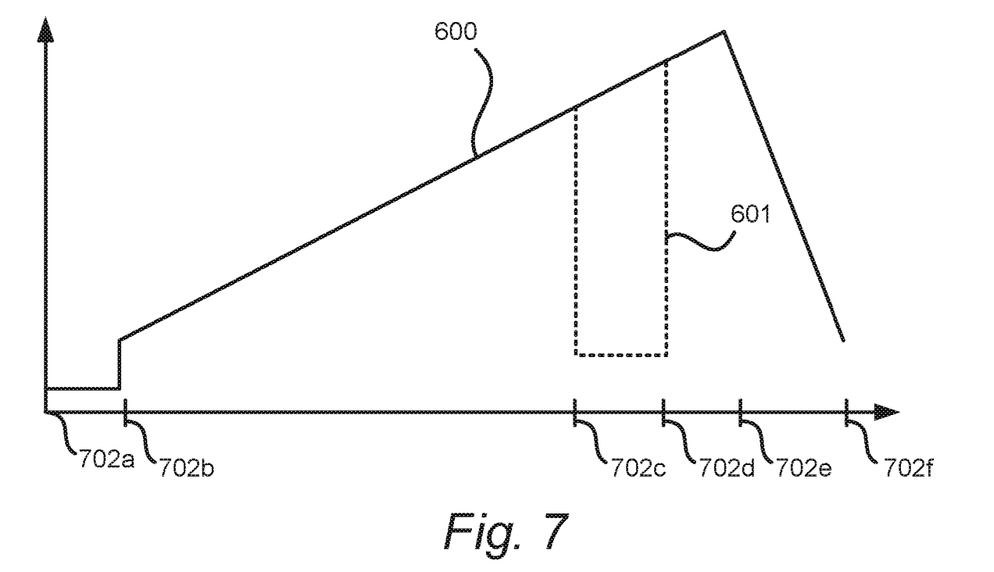
FIG. 7 shows detected event markers to be used for adapting the external content to the video stream according to embodiments.

According to some embodiments, the step of fitting the predetermined parametrizable function to the plurality of second difference indicators further comprise detecting a plurality of event markers, each event marker corresponding to a frame of the video stream. FIG. 7 shows by way of example such markers. In FIG. 7, the FNM 600 from FIG. 6 is shown. In this example, six event markers 702a-f are detected. Each event marker thus corresponds to a point in time of the video stream. A first event marker 702a marks the starting point of the intro phase. This event marker may of course be omitted if it always is assumed that the intro phase starts immediately when the video stream starts (at 0 seconds). The second event marker 702b marks the ending point of the intro phase and at the same time the starting point for the build-up phase. The third event marker 702c marks the starting point in time for an anti-climax 601. The fourth event marker 702d marks the ending point in time for the anti-climax 601. The fifth event marker 702e marks the ending point for the build-up phase and at the same time the starting point in time for the outro phase. The sixth event marker 702f marks the ending point in time for the outro phase. This may of course be omitted in if it is always assumed that the outro phase ends when the video stream ends.

According to some embodiments, a plurality of predetermined parametrizable functions 501a-n are fitted to the plurality of second difference indicators. This is shown in FIG. 8. The fitted parametrizable function 501a-n that has a highest fitness value is then chosen as the FNM. Furthermore, the number of anti-climaxes that are determined may be both adaptive, e.g. fully depend on how many sub-spans according to above that can be found, or it may be a max number, e.g. maximum one, two, five, etc., anti-climaxes may be detected. In this case, if more anti-climaxes exist than the maximum number, the selected anti-climax(es) may be selected based on the "depth" of the anti-climax (e.g. how far below the threshold that the sub span of the difference indicators exists), or be selected based on the length of the sub span. Different predetermined parametrizable functions may allow for different number of anti-climaxes.

According to some embodiments, a plurality of FNMs (e.g. top two or top three etc.) with highest fitness value are shown as options to a user, who is able to select according to taste. In another embodiment, such highest fitness FNMs are used to show the corresponding final results of the adapted external content to a user, who is then able to select according to taste.

Figure 9:
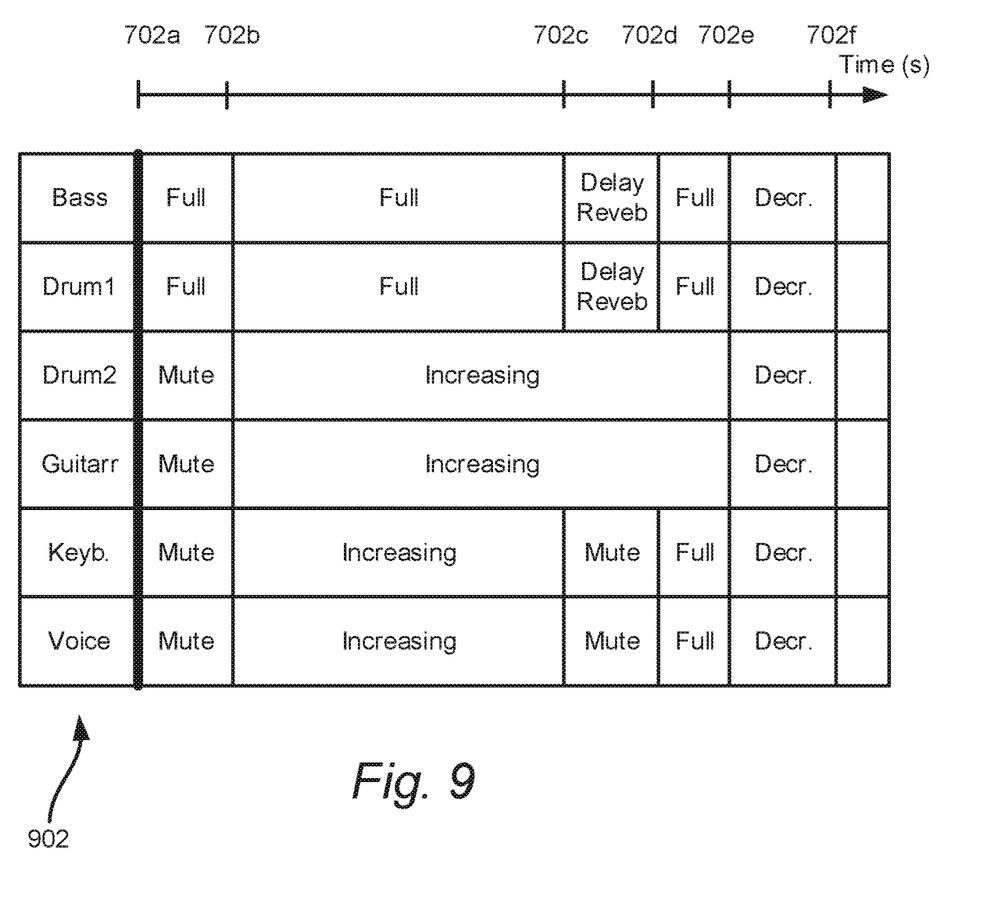
FIG. 9 shows, by way of example, how the detected event markers of FIG. 7 is used for adapting a multitrack music recording to the video stream.

FIG. 9 shows by way of example how adaptation of multi-track music can be done based on the detected event markers from FIG. 8. It should be noted that the use of music, and multi-track music, as external content is just by way of example. As clearly set out above, other types of external content such as animations, surrounding light, etc., may equally well be used.

In FIG. 9, a multi-track music recording 902 with six different tracks is used. During the intro phase, i.e. from event marker 702a to event marker 702b, only the bass track and the first of two drum tracks are unmuted and playing on full volume, the rest of the tracks are muted. During the build-up phase, from event marker 702b to event marker 702e, the second drum track and the guitar track are continuously volume adjusted (increasing). The same goes for the keyboard track and the voice track, however, these two tracks are muted during the anti-climax (from event marker 702c to event marker 702d). During the anti-climax phase, the bass track and the first drum track are processed to have delay and/or reverb added to them. During the outro phase, from event marker 702e to event marker 702f, all tracks are volume adjusted in a decreasing manner.

According to some embodiments, the step of using the FNM to adapt external content to the video stream (e.g. as shown in FIG. 9) is automatic. This means that an algorithm makes the decisions for adapting the external content e.g. to mute a specific track at a specific point in time etc. According to other embodiments, the FNM, or the detected event markers of the FNM, is/are imported to a software able to adapt the external content used, for example a digital audio workstation (DAW). A user of the DAW may then use the imported FNM/detected event markers as guidance when adapting the multi-track music recording to the video stream.

As evident from the above, the adapting of external content to the video stream may comprise muting and unmuting of tracks of a multitrack music recording based on the FNM. Alternatively, or additionally, the adapting of external content to the video stream may comprise volume adjustment of tracks of a multitrack music recording 902 based on the FNM. The muting/unmuting and/or volume adjustment may also be done on the multi-track music track based on the detected anti-climax(es), i.e. based on the starting point in time and the ending point in time for the sub time span of the video stream which corresponds to the anti-climax. Other types of adaptations of the external content may be performed, for example adding effects such as reverb or delay to tracks of the multi-track music recording 902. Further examples include changing the tempo of the music (of all tracks or for a specific track), e.g. such that a chorus will end exactly at the point where an anti-climax starts. Also, changing the tempo can be used to emphasize different phases of the FNM, for example by lowering the tempo during an outro phase, or increasing the tempo during a build-up phase.

Figure 10:
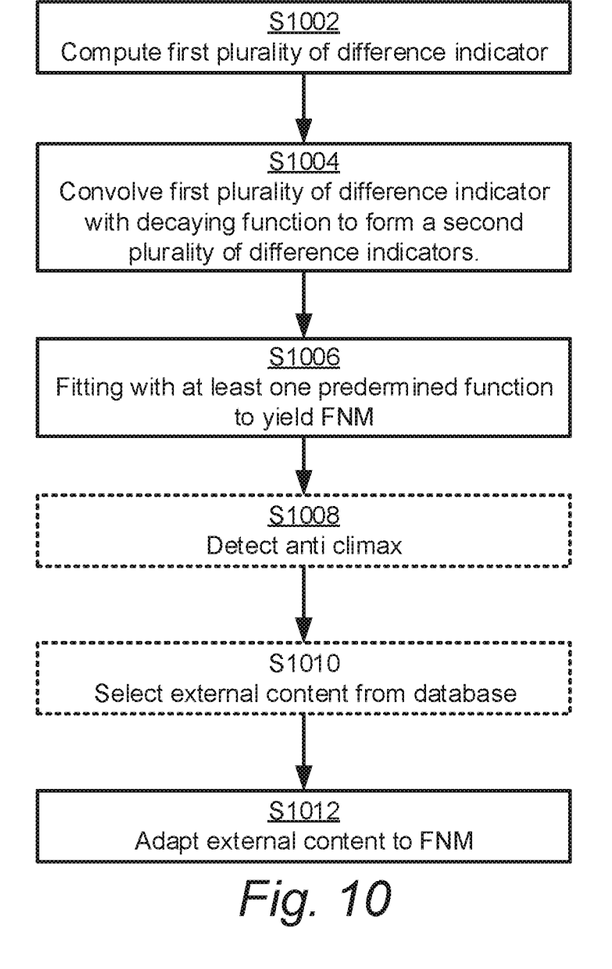
FIG. 10 shows a method for adapting external content to a video stream according to embodiments, FIG. 11 show a device implementing the method of FIG. 10, and connected to a database with external content.

FIG. 10 shows by way of example a method for adapting external content to a video stream. The method comprises the step of computing S1002 a first plurality of difference indicators, each indicating a difference between values of the pixels of subsequent frames. The first plurality of difference indicators is then convolved S1004 with a strictly decreasing function to form a second plurality of difference indicators. After the second plurality of difference indicators are computed, a predetermined parametrizable function is fitted S1006 to the second plurality of difference indicators, thereby yielding a FNM for the video stream during the time span of the video stream, Optionally, anti-climax(es) is/are detected S1108. The external content may optionally be selected S1010 from a database comprising suitable external content. The external content may for example be bought to sort out e.g. copyright issues. Finally, the external content is adapted S1012 to the FNM, and optionally to the detected anti-climax(es).

Figure 11:
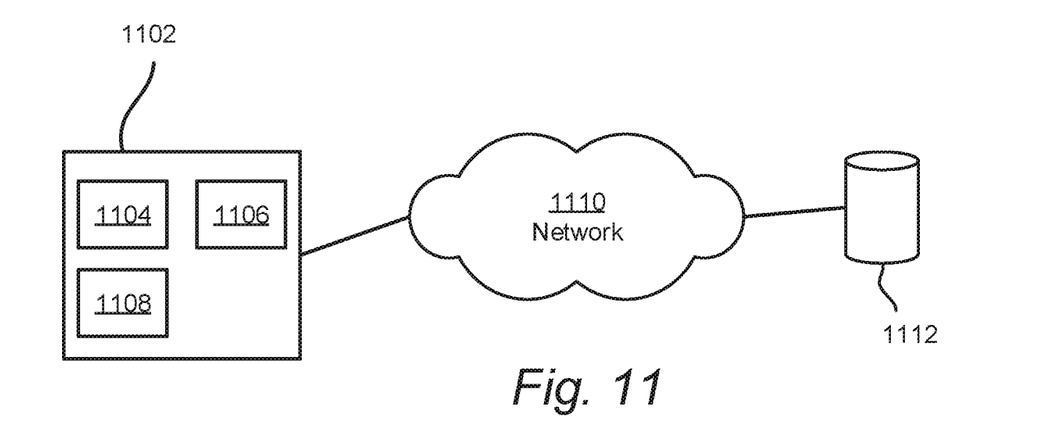

The method of FIG. 10 and as described herein may be implemented in a computer program product. In other words, a computer program product may comprise a computer-readable storage medium with instructions adapted to carry out the method of FIG. 10 and as described herein when executed by a device having processing capability. Such device is shown in FIG. 11, where a device 1102 comprises a processor 1104 adapted for performing the method for adapting external content to a video stream as described herein. The device 1102 may further comprise a memory 1106 holding the instruction adapted to carry out the method of FIG. 10 and as described herein. Moreover, the device may provide functionality for manually editing the FNM by a user, or for manually editing the fitted predetermined parametrizable function by a user, or for manually editing the starting point in time and the ending point in time (of an anti-climax) by a user. Such functionality may be provided via a user interface 1108. Moreover, the device further comprises a computer program product suitable for adapting external content, where the computer program product may be stored in the memory 1106 and its functionality may be provided to the user via the user interface 1108. According to some embodiments, the external content is also stored in the memory 1106. Alternatively, or additionally, the device 1102 may be connected to a database 1112 via a network 1110 as shown in FIG. 11. The database 1112 may comprise external content for selection by the device. As such, device 1102 may provide functionality for selecting external content (e.g. music such as in a multi-track format) from the database 1112, for example via the user interface 1108 of the device 1102.

III. EQUIVALENTS, EXTENSIONS, ALTERNATIVES AND MISCELLANEOUS

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The systems and methods disclosed hereinabove may be implemented as software, firmware, hardware, or a combination thereof. In a hardware implementation, the division of tasks between functional units or stages referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and non-volatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

Various aspects of the present invention may be appreciated from the following enumerated example embodiments (EEEs):

EEE 1. A method for adapting external content to a video stream having a time span, the video stream comprising a plurality of frames each comprising pixels, the method comprising the steps of:

computing a first plurality of difference indicators, each indicating a difference between values of the pixels of subsequent frames, wherein the computing of each specific difference indicator of the first plurality of difference indicators comprises:

comparing corresponding pixel values between two subsequent frames, and calculating the specific difference indicator based on the comparisons,     computing a second plurality of difference indicators by convolving the first plurality of difference indicators with a decaying function, each difference indicator of the second plurality of difference indicators corresponding to a specific position in time of the video stream, fitting a predetermined parametrizable function to the second plurality of difference indicators, and thereby yielding a function descriptive of a narrative model, FNM, for the video stream during the time span of the video stream, using the FNM to adapt external content to the video stream.

EEE 2. The method of EEE 1, further comprising the steps of:

after yielding the FNM for the video stream:

comparing the second plurality of difference indicators to the FNM, determining that it exist a continuous subset of difference indicators among the second plurality of difference indicators wherein all difference indicators of the subset of difference indicators have a value being at least a threshold lower than a corresponding value in the FNM, wherein the continuous subset of difference indicators corresponding to a sub time span of the video stream, adapting the external content to the video stream also based on a starting point in time and an ending point in time for the sub time span of the video stream.

EEE 3. Method according to EEE 1-2, wherein the step of computing the plurality of second difference indicators further comprises the step of comparing each of the first plurality of difference indicators to a predetermined threshold and setting any difference indicator being below said predetermined threshold to zero before performing the step of convolving the first plurality of difference indicators with the decaying function.

EEE 4. Method according to EEE 1-3, wherein each specific difference indicator of the first plurality of difference indicators is computed by calculating differences between RGB values of corresponding pixels of two subsequent frames, and calculating the specific difference indicator based on the calculated differences.

EEE 5. Method according to EEE 1-4, wherein the decaying function is an exponentially decaying function which falls below 1% of its initial value after 0.1-2 seconds.

EEE 6. Method according to EEE 5, wherein the decaying function is an exponentially decaying function which falls below 1% of its initial value after 1 second.

EEE 7. Method according to any of the previous EEEs wherein the step of using the FNM to adapt external content to the video stream is automatic.

EEE 8. Method according to any of the previous EEEs, wherein the external content consists of pre-recorded music.

EEE 9. Method according to EEE 8, wherein the pre-recorded music is recorded in a multitrack format.

EEE 10. Method according to EEE 9, wherein the step of using the FNM to adapt external content to the video stream comprises muting and unmuting of a track of a multitrack music recording based on the FNM.

EEE 11. Method according to any one of EEEs 9-10, wherein the using the FNM to adapt external content to the video stream comprises volume adjustment of a track of a multitrack music recording based on the FNM.

EEE 12. Method according to any one of EEEs 9-11, when being dependent on EEE 2, wherein the step of adapting the external content to the video stream also based on a starting point in time and an ending point in time for the sub time span of the video stream comprises muting and unmuting of a track of a multitrack music recording based on the starting point in time and the ending point in time.

EEE 13. Method according to any one of EEEs 9-12, when being dependent on EEE 2, wherein the step of adapting the external content to the video stream also based on a starting point in time and an ending point in time for the sub time span of the video stream comprises volume adjustment of a track of a multitrack music recording based on the starting point in time and the ending point in time.

EEE 14. Method according to any of the previous EEEs, wherein the step of fitting the predetermined parametrizable function to the second plurality of difference indicator, and thereby yielding a FNM for the video stream during the time span of the video stream, is done by least squares fitting.

EEE 15. Method according to any of the previous EEEs, wherein a plurality of predetermined parametrizable functions is fitted to the plurality of second difference indicators, wherein the method further comprises calculating a fitness value for at least two fitted parametrizable functions and selecting the function with the highest fitness value as the FNM.

EEE 16. Method according to any of the previous EEEs, wherein the step of fitting the predetermined parametrizable function to the plurality of second difference indicators further comprise detecting a plurality of event markers, each event marker corresponding to a frame of the video stream.

EEE 17. The method of EEE 16, when being dependent on EEE 10, wherein the muting and unmuting of tracks of the multitrack music recording is based on the detected event markers.

EEE 18. Method according to any of the previous EEEs, wherein the step of computing a first plurality of difference indicators comprise comparing corresponding pixel values between adjacent frames.

EEE 19. Method according to any of the previous EEEs, wherein the step of comparing subsequent frames comprises calculating an absolute difference between values of corresponding pixels.

EEE 20. Method according to any of the previous EEEs, wherein the second plurality of difference indicators is normalized to comprise values between 0-1.

EEE 21. Method according to any of the previous EEEs, wherein corresponding pixels are pixels having a same index value in the two subsequent frames.

EEE 22. Method according to any of the previous EEEs, wherein the step of adapting external content to the video stream comprises the step of selecting said external content from a database of external content.

EEE 23. Method according to any one of the previous EEEs, further comprising the step of selecting the predetermined parametrizable function from a plurality of predetermined parametrizable functions.

EEE 24. Method according to any one of the previous EEEs, further comprising providing functionality for manually editing the FNM by a user.

EEE 25. Method according to any one of the previous EEEs, further comprising providing functionality for manually editing the fitted predetermined parametrizable function by a user.

EEE 26. Method according to any one of the previous EEEs when being dependent on EEE 2, further comprising providing functionality for manually editing the starting point in time and the ending point in time by a user.

EEE 27. A computer program product implementing a method for adapting external content to a video stream having a time span, the video stream comprising a plurality of frames each comprising pixels, the method comprising the steps of:
- computing a first plurality of difference indicators, each indicating a difference between values of the pixels of subsequent frames, wherein the computing of each specific difference indicator of the first plurality of difference indicators comprises:
  - comparing corresponding pixel values between two subsequent frames, and calculating the specific difference indicator based on the comparisons,
- computing a second plurality of difference indicators by convolving the first plurality of difference indicators with a decaying function, each difference indicator of the second plurality of difference indicators corresponding to a specific position in time of the video stream,
- fitting a predetermined parametrizable function to the second plurality of difference indicator, and thereby yielding a function descriptive of a narrative model, FNM, for the video stream during the time span of the video stream,
- using the FNM to adapt external content to the video stream.

EEE 28. A device for adapting external content to a video stream having a time span, the video stream comprising a plurality of frames each comprising pixels, the device comprising a processor adapted for:
- computing a first plurality of difference indicators, each indicating a difference between values of the pixels of subsequent frames, wherein the computing of each specific difference indicator of the first plurality of difference indicators comprises:
  - comparing corresponding pixel values between two subsequent frames, and calculating the specific difference indicator based on the comparisons,
- computing a second plurality of difference indicators by convolving the first plurality of difference indicators with a decaying function, each difference indicator of the second plurality of difference indicators corresponding to a specific position in time of the video stream,
- fitting a predetermined parametrizable function to the second plurality of difference indicator, and thereby yielding a function descriptive of a narrative model, FNM, for the video stream during the time span of the video stream,
- using the FNM to adapt external content to the video stream.

EEE 29. Device according to EEE 28, wherein the device further comprises a computer program product suitable for adapting external content.

EEE 30. Device according to EEE 29, wherein the external content is music.

EEE 31. A system for adapting external content to a video stream having a time span, the video stream comprising a plurality of frames each comprising pixels, the system comprising a device connected to a database, the database comprising external content, wherein the device comprises a processor adapted for:
- computing a first plurality of difference indicators, each indicating a difference between values of the pixels of subsequent frames, wherein the computing of each specific difference indicator of the first plurality of difference indicators comprises:
  - comparing corresponding pixel values between two subsequent frames, and calculating the specific difference indicator based on the comparisons,
- computing a second plurality of difference indicators by convolving the first plurality of difference indicators with a decaying function, each difference indicator of the second plurality of difference indicators corresponding to a specific position in time of the video stream,
- fitting a predetermined parametrizable function to the second plurality of difference indicator, and thereby yielding a function descriptive of a narrative model, FNM, for the video stream during the time span of the video stream,
- selecting external content from the database, and
- using the FNM to adapt the selected external content to the video stream.

EEE 32. Computer program product having instructions which, when executed by a computing device or system, cause said computing device or system to perform the method according to any of the EEEs 1-26.

The invention claimed is:

1. A method for adapting external content to a video stream having a time span, the video stream comprising a plurality of frames each comprising pixels, the method comprising the steps of:
   - computing a first plurality of difference indicators, each difference indicator of the first plurality of difference indicators indicating a difference between values of the pixels between a frame of the plurality of frames and an $n^{th}$ subsequent frame of the plurality of frames, wherein n is an integer$\geq 1$;
   - computing a second plurality of difference indicators by convolving the first plurality of difference indicators with a strictly decreasing function, each difference indicator of the second plurality of difference indicators corresponding to a specific position in time of the video stream,
   - fitting a predetermined parametrizable function to the second plurality of difference indicators, thereby yielding a function descriptive of a narrative model, FNM, for the video stream during the time span of the video stream,
   - using the FNM to adapt external content to the video stream.

2. The method according to claim 1, wherein the computing of each specific difference indicator of the first plurality of difference indicators comprises:
   - comparing corresponding pixel values between the frame of the plurality of frames and the $n^{th}$ subsequent frame of the plurality of frames; and
   - calculating the specific difference indicator based on the comparisons.

3. The method according to claim 1, further comprising the steps of:
   - after yielding the FNM for the video stream:
     - comparing the second plurality of difference indicators to the FNM,
     - determining that it exists a continuous subset of difference indicators among the second plurality of difference indicators wherein all difference indicators of the subset of difference indicators have a value being at least a threshold lower than a corresponding value in the FNM, wherein the continuous subset of difference indicators corresponding to a sub time span of the video stream, adapting the external content to the video stream also based on a starting point in time and an ending point in time for the sub time span of the video stream.

4. The method according to claim 3, wherein the step of adapting the external content to the video stream also based on a starting point in time and an ending point in time for the sub time span of the video stream comprises muting and unmuting of a track of a multitrack music recording based on the starting point in time and the ending point in time.

5. The method according to claim 3, wherein the step of adapting the external content to the video stream also based on a starting point in time and an ending point in time for the sub time span of the video stream comprises volume adjustment of a track of a multitrack music recording based on the starting point in time and the ending point in time.

6. The method according to claim 1, wherein the step of computing the plurality of second difference indicators further comprises the step of comparing each of the first plurality of difference indicators to a predetermined threshold and setting any difference indicator being below said predetermined threshold to zero before performing the step of convolving the first plurality of difference indicators with the strictly decreasing function.

7. The method according to claim 1, wherein each specific difference indicator of the first plurality of difference indicators is computed by calculating differences between RGB values of corresponding pixels of the frame and the $n^{th}$ subsequent frame, and calculating the specific difference indicator based on the calculated differences.

8. The method according to claim 1, wherein the strictly decreasing function is an exponentially decaying function or a linear decreasing function.

9. The method according to claim 8, wherein the strictly decreasing function is an exponentially decaying function which falls below 1% of its initial value after 0.1-2.0 seconds.

10. The method according to claim 9, wherein the exponentially decaying function is an exponentially decaying function which falls below 1% of its initial value after 1 second.

11. The method according to claim 1 wherein the step of using the FNM to adapt external content to the video stream is automatic.

12. The method according to claim 1, wherein the external content consists of pre-recorded music.

13. The method according to claim 12, wherein the pre-recorded music is recorded in a multitrack format.

14. The method according to claim 13, wherein the step of using the FNM to adapt external content to the video stream comprises muting and unmuting of a track of a multitrack music recording based on the FNM.

15. The method according to claim 13, wherein the using the FNM to adapt external content to the video stream comprises volume adjustment of a track of a multitrack music recording based on the FNM.

16. The method according to claim 1, wherein the step of fitting the predetermined parametrizable function to the second plurality of difference indicator, thereby yielding an FNM for the video stream during the time span of the video stream, is done by least squares fitting.

17. A computer program product having instructions which, when executed by a computing device or system, cause said computing device or system to perform the method according to claim 1.

18. A system for adapting external content to a video stream having a time span, the video stream comprising a plurality of frames each comprising pixels, the system comprising a device connected to a database, the database comprising external content, wherein the device comprises a processor adapted for:
    computing a first plurality of difference indicators, each difference indicator of the first plurality of difference indicators indicating a difference between values of the pixels between a frame of the plurality of frames and an $n^{th}$ of subsequent frame of the plurality of frames, wherein n is an integer≥1;
    computing a second plurality of difference indicators by convolving the first plurality of difference indicators with a strictly decreasing function, each difference indicator of the second plurality of difference indicators corresponding to a specific position in time of the video stream,
    fitting a predetermined parametrizable function to the second plurality of difference indicator, thereby yielding a function descriptive of a narrative model, FNM, for the video stream during the time span of the video stream,
    selecting external content from the database, and
    using the FNM to adapt the selected external content to the video stream.

19. The system of claim 18, wherein the computing of each specific difference indicator of the first plurality of difference indicators comprises:
    comparing corresponding pixel values between the frame of the plurality of frames and the $n^{th}$ subsequent frame of the plurality of frames; and
    calculating the specific difference indicator based on the comparisons.

* * * * *